United States Patent
Ji et al.

(10) Patent No.: US 7,715,846 B2
(45) Date of Patent: May 11, 2010

(54) VERSATILE SYSTEM FOR ADAPTIVE SUBCHANNEL ALLOCATION IN WIRELESS COMMUNICATIONS

(75) Inventors: Baowei Ji, Richardson, TX (US); Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 11/369,810

(22) Filed: Mar. 7, 2006

(65) Prior Publication Data

US 2007/0213069 A1    Sep. 13, 2007

(51) Int. Cl.
    *H04Q 7/20* (2006.01)
(52) U.S. Cl. ............... 455/447; 455/445; 455/12.1; 455/452.2; 455/423; 455/11.1; 455/450; 455/446; 455/517; 370/203; 370/208
(58) Field of Classification Search ............ 455/445, 455/450, 447, 12.1, 452.2, 423, 517, 11.1, 455/449, 561, 458, 521, 9, 518, 519, 644; 370/203, 348, 260, 338, 208, 238, 235, 254, 370/230, 351, 315, 409, 404, 401; 709/9, 709/223, 236, 238; 715/736, 734
See application file for complete search history.

(56) References Cited

U.S. PATENT DOCUMENTS

| | | | |
|---|---|---|---|
| 5,737,704 A | * | 4/1998 | Jin et al. .............. 455/450 |
| 6,236,856 B1 | * | 5/2001 | Abbadessa ............. 455/423 |
| 2004/0176097 A1 | * | 9/2004 | Wilson et al. ........... 455/452.2 |
| 2004/0203914 A1 | * | 10/2004 | Kall et al. ............. 455/456.1 |
| 2004/0259558 A1 | * | 12/2004 | Skafidas et al. ......... 455/450 |
| 2005/0185574 A1 | * | 8/2005 | Codreanu et al. ........ 370/208 |
| 2005/0197060 A1 | * | 9/2005 | Hedinger et al. ........ 455/12.1 |
| 2005/0197129 A1 | * | 9/2005 | Cho et al. ............. 455/447 |
| 2006/0099954 A1 | * | 5/2006 | Henderson et al. ...... 455/447 |
| 2006/0111117 A1 | * | 5/2006 | Vilmur et al. .......... 455/445 |
| 2006/0270416 A1 | * | 11/2006 | Perets et al. .......... 455/452.2 |

* cited by examiner

*Primary Examiner*—Rafael Pérez-Gutiérrez
*Assistant Examiner*—Joseph Arevalo

(57) ABSTRACT

Dynamic and asymmetric sub-channel allocation in a wireless communications system—particularly an orthogonal frequency division multiple access (OFDMA) system—is disclosed. The methods and constructs of the present disclosure identify a plurality of cells, each divided into an equal number of sectors. A transmission channel associated with each cell is divided into a plurality of sub-channel groups. For each sector, a set of adjoining inter and intra coverage area sectors is identified, and associated together as a pool set. For each such pool set, a resource pool is formed from the plurality of sub-channel groups. A single sub-channel group from a resource pool is allocated to each sector in a corresponding pool set. Additional sub-channel group in that resource pool are thereafter allocated to sectors from the pool set on an as-needed, as-available basis.

20 Claims, 4 Drawing Sheets

VERSATILE SYSTEM FOR ADAPTIVE SUBCHANNEL ALLOCATION IN WIRELESS COMMUNICATIONS

TECHNICAL FIELD OF THE INVENTION

The present application relates generally to the field of wireless communications technologies and, more particularly, to apparatus and methods for providing adaptive, asymmetric allocation of sub-channel resources within a wireless communications system.

BACKGROUND OF THE INVENTION

Increasing demand for more powerful and convenient data communication has resulted in the proliferation of a number of wideband and high-throughput wireless technologies. In the field of wireless communications, a number of industry standards and operational protocols have been developed to address different wireless end-user applications.

Many of the current and emerging high throughput wireless technologies utilize a modulation scheme, such as orthogonal frequency division multiplexing (OFDM)—to organize or allocate data transmissions across their transmission bandwidths. OFDM divides a transmission channel into many narrowband sub-channels. Each sub-channel carries, for example, a quadrature amplitude modulated (QAM) signal. In a number of OFDM systems, only a single user may transmit on all of the sub-carriers at any given time. Such a system may employ time division or frequency division arbitration techniques to support multiple users.

Orthogonal frequency division multiple access (OFDMA), also referred to as multi-user OFDM, is an extension of OFDM that is gaining interest as a modulation and multiple access method for next-generation wireless networks. OFDMA divides a frequency band equally into multiple orthogonal sub-carriers—each grouping of which may be referred to as sub-channel. A given user is typically assigned one or more sub-channels, such that the user's original high-speed data can be transmitted on multiple sub-carriers—in parallel—using relatively low rates. This provides OFDM with inherent advantages for suppressing inter-symbol interference (ISI) incurred by frequency-selective fading. The OFDMA sub-channels may thus be assigned to multiple users for simultaneous multiple access, or multiple sub-channels may be assigned to a single user for higher speed data transmission.

There are a number of emerging high throughput wireless standards and operational protocols in which OFDMA may be supported or utilized—including IEEE 802.16, WiBRO (Wireless Broadband), and a number of advanced 3G (third generation) and 4G (fourth generation) systems. In some conventional systems, operational simplicity may be provided by assigning neighboring cells in a wireless network different transmission frequency spectrums (i.e., channels), such that no two neighboring cells share the same channel spectrum. In the interest of providing more efficient spectrum utilization, however, some OFDMA systems may divide a single channel frequency spectrum into a number of sub-channel groups. Each cell within the network coverage area may then be subdivided into a corresponding number of sectors. Sub-channel groups may then be allocated and associated with corresponding sectors in such a manner that adjacent cells may share the same channel frequency spectrum, while no two adjoining sectors—either intra-cell or inter-cell—share the same sub-channel. This is sometimes referred to in such contexts as a "frequency-reuse-of-1" scheme. To the extent that conventional systems provide a "frequency-reuse-of-1" topology or protocol, such systems usually utilize a sub-channel allocation that is symmetric and static in nature.

Unfortunately, actual real-time communication traffic in an operational end-user wireless system is usually unevenly distributed among sectors (i.e., asymmetric). Traffic requirements can vary dramatically, as large numbers of end-users transition into and out of a given cell and its neighbor cells. Conventional schemes (e.g., IEEE 802.16) do not appear to address asymmetric or dynamic allocation of sub-channel resources among adjoining (or adjacent) sectors and cells, and thus commonly have difficulty in adequately or efficiently meeting fluctuating end-user demands for high data rate. For example, a static allocation scheme may under-allocate bandwidth in a heavily populated sector or cell, while wasting bandwidth by over-allocation in a sparsely populated sector or cell. For example, a static allocation scheme may under-allocate bandwidth in a heavily populated sector or cell, while wasting bandwidth by over-allocation in a sparsely populated sector or cell.

As a result, there is a need for a system that provides both dynamic and asymmetric sub-channel allocation groups for neighbor sectors and cells in a wireless system. In particular, there is a need for a system that avoids undue inter-cell and intra-cell interference while maintaining frequency-reuse properties, thereby providing efficient and dependable wireless communications in an easy and cost-effective manner.

SUMMARY OF THE INVENTION

A versatile system, comprising various apparatus and methods, provides dynamic and asymmetric sub-channel allocation groups for adjacent sectors and cells in a frequency-reuse wireless system. The system of the present disclosure provides a dynamic allocation construct that optimizes spectrum utilization for each sector in system, while minimizing or obviating inter-cell and intra-cell interference. The system easily adapts to various service requirements from a broad end-user base, in OFDMA and other similar systems. The system of the present disclosure thus provides efficient and dependable wireless communications, in an easy and cost-effective manner.

Specifically, constructs and methods for dynamic and asymmetric (hereafter, "dynamic") sub-channel allocation in an OFDM-type wireless communications system are disclosed. The architecture provides methods and constructs that identify a plurality of cells, each divided into an equal number of sectors. A transmission channel associated with each cell is divided into a plurality of sub-channel groups. For each sector, a set of adjoining inter and intra coverage area sectors is identified, and associated together as a pool set. For each such pool set, a resource pool is formed from the plurality of sub-channel groups. A single sub-channel group from a resource pool is allocated to each sector in a corresponding pool set. Additional sub-channel group in that resource pool are thereafter allocated to sectors from the pool set on an as-needed, as-available basis.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "construct", "function", "element" or "component" mean any device, system or part thereof that control or perform at least one operation, and may be implemented in hardware, firmware or software, or some combination of at least two of the same. It should be noted that the functionality associated with any particular construct or element may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Hereinafter, certain aspects of the present disclosure are described in relation to illustrative protocols and operations, such as OFDMA and IEEE 802.16. Those skilled in the art, however, will understand that the principles and teachings of the present disclosure may be implemented in any suitably arranged wireless communications system—whether or not such system relies upon OFDMA, IEEE 802.16, or some other operational protocol.

The following discloses a versatile system comprising various apparatus and methods that provides dynamic and asymmetric sub-channel allocation groups for adjacent sectors and cells in a wireless system. A dynamic allocation construct—provided, for example, within a network node or server computer that monitors resource allocation among adjacent cells or cell sectors—optimizes spectrum utilization for each sector in an IEEE 802.16 "frequency-reuse-of-1" type of system, while minimizing or obviating inter-cell and intra-cell interference.

Specifically, constructs and methods for dynamic and asymmetric sub-channel allocation in an OFDM-type wireless communications system are disclosed. Transmission spectrum resources are pooled, and each sector is provided with only the minimum spectrum needed for efficient performance. It should be understood that—for purposes of this disclosure—the term "transmission" is used, in relation to frequency ranges or spectrums, in a general sense, and comprehends both signal transmitting and signal receiving operations. As demands or needs of a sector increase or decrease, a corresponding level of resource is either allocated from or returned to the transmission spectrum pool.

Figure 1:
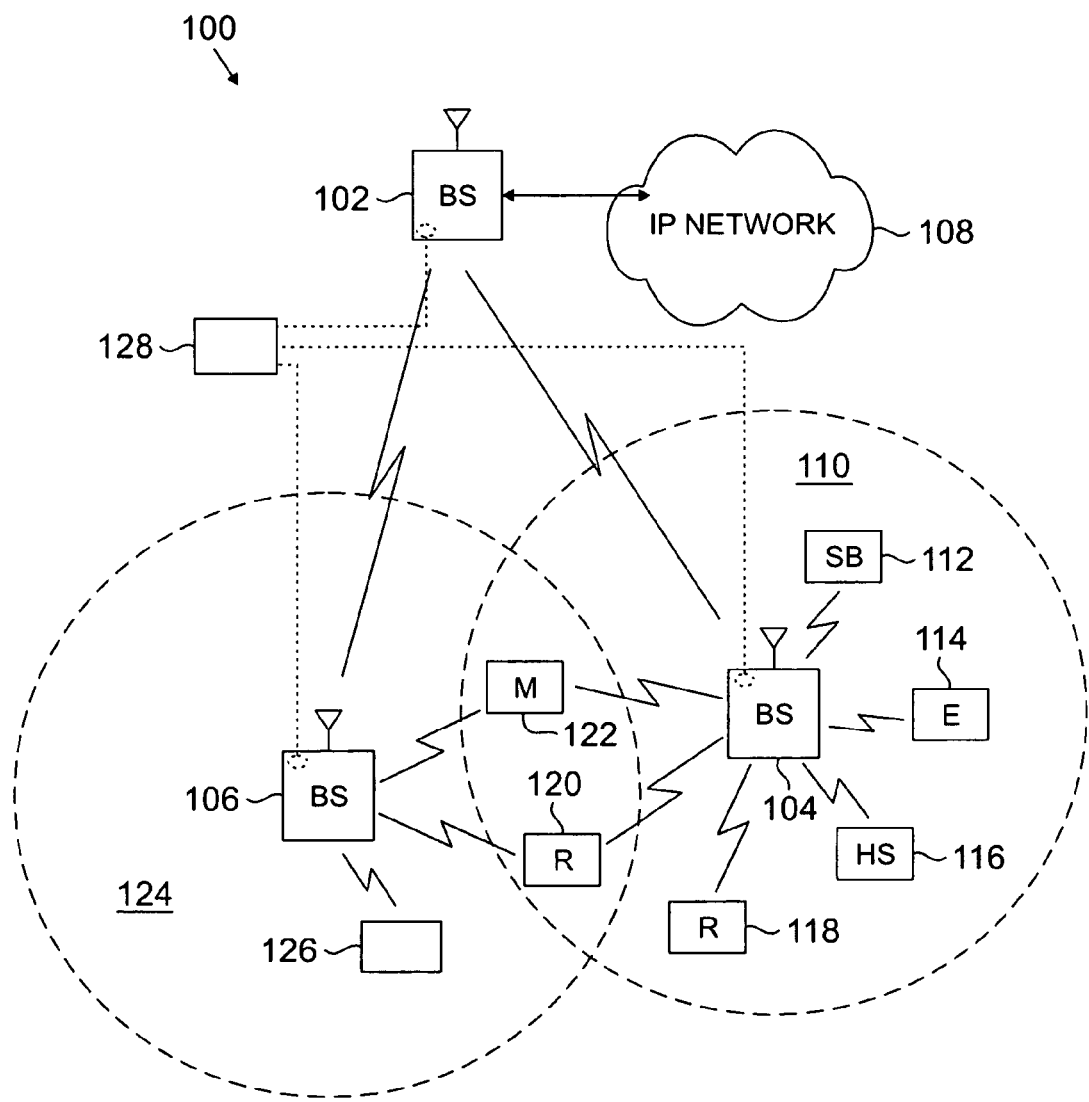
FIG. 1 illustrates one embodiment of wireless communications system in accordance with the present disclosure.

For purposes of illustration and explanation, FIG. 1 illustrates a general wireless network 100 that is suitable for sub-channel allocation according to certain aspects of the present disclosure. In the illustrated embodiment, wireless network 100 includes base stations (BS) 102, 104 and 106. Base stations 102-106 inter-communicate via any suitable messaging or signaling protocols. Base station 102 also communicates with internet protocol (IP) network 108, such as the internet, a proprietary IP network, or other data network. In alternate embodiments, base stations 104 and 106 may be connected directly to an internet protocol (IP) network, such as the Internet, by means of a wired broadband connection, such as an optical fiber, DSL, cable or T1/E1 line, rather than indirectly through base station 102. These and other variations or combinations thereof are all comprehended by the system of the present disclosure.

In system 100, base station 104 provides wireless broadband access to network 108, via base station 102, to a first plurality of subscriber stations within a coverage area, or cell, 110 of base station 104. The first plurality of subscriber stations includes subscriber stations (SS) 112, 114, 116, 118, 120 and 122. Subscriber stations 112-122 may comprise a variety of different end-user devices or applications. For example, in one embodiment, SS 112 may be located in a small business (SB), SS 114 may be located in an enterprise (E), SS 116 may be located in a WiFi hotspot (HS), SS 118 may be located in a first residence, SS 120 may be located in a second residence, and SS 122 may be a mobile (M) device.

Base station 106 provides wireless broadband access to network 108, via base station 102, to a first plurality of subscriber stations within a coverage area, or cell, 124 of base station 106. The second plurality of subscriber stations includes subscriber stations 120 and 122, as well as a mobile subscriber station 126.

In other embodiments, base station 102 may be in communication with either fewer or more base stations. Furthermore, while only seven subscriber stations are depicted in FIG. 1, it should be easily understood and appreciated that wireless network 100 may provide wireless communications to hundreds or thousands of subscriber stations. It is noted that subscriber stations 120 and 122 are on the edge of both coverage areas 110 and 124. Subscriber stations 120 and 122 may therefore each communicate with both base stations 104 and 106 and may be said to be operating in handoff mode, as known to those of skill in the art. Subscriber stations 112 and 126 may move fully into or out of coverage areas 110 and 114, as well.

In certain embodiments of network 100, base stations 102-106 may communication with each other and the subscriber stations using, for example, an IEEE-802.16 wireless metropolitan area network standard, such as, for example, an IEEE-802.16(e) standard. In other embodiments, however, different wireless protocols may be employed, such as, for example, a HIPERMAN wireless metropolitan area network standard. Base station 102 may communicate through direct line-of-sight or non-line-of-sight with base stations 104 and 106, depending on the technology used for wireless backhaul. In certain embodiments, base stations 102-106 may be interconnected via wired connections such as cable or optical fiber. Base stations 104 and 106 may each communicate through non-line-of-sight with the subscriber stations using OFDM and/or OFDMA techniques.

Subscriber stations 112-122 and 126 may use broadband access to network 108 to access voice, data, video, video teleconferencing, and/or other broadband services. In certain embodiments, one or more of the subscriber stations may be associated with an access point (AP) of a WiFi WLAN. Subscriber stations 122 and 126 may be any of a number of mobile devices, including a wireless-enabled laptop computer, personal data assistant, notebook, handheld device, or other wireless-enabled device.

Dotted lines show the approximate extents of cells 110 and 124, which are shown as approximately circular for the purposes of illustration and explanation only. It should be clearly understood that the coverage areas associated with base stations, for example, cells 120 and 125, may have other shapes, including irregular shapes, depending upon the configuration of the base stations and variations in the radio environment associated with natural and man-made obstructions.

Also, coverage areas associated with base stations are not constant over time—they may be expanding or contracting or changing shape based on, for example, changing transmission power levels of base stations and/or subscriber stations, weather conditions, and other factors. In certain embodiments, for example, the radius of cells 110 and 124 may extend in the range from less than 2 kilometers to about fifty kilometers from their respective base stations.

Base stations, such as stations 102-106, may employ directional antennas to support a plurality of sectors within their respective cells. In FIG. 1, base stations 104 and 106 are depicted approximately in the center of coverage areas 110 and 124, respectively. In other embodiments, the use of directional antennas may provide for a base station located near the edge of a coverage area—near the point of a cone-shaped coverage area, for example. Further specifics regarding the interrelation and segmentation of adjacent/adjoining cells according to the system of the present disclosure are described in greater detail with reference now to FIGS. 2-4.

Figure 2:
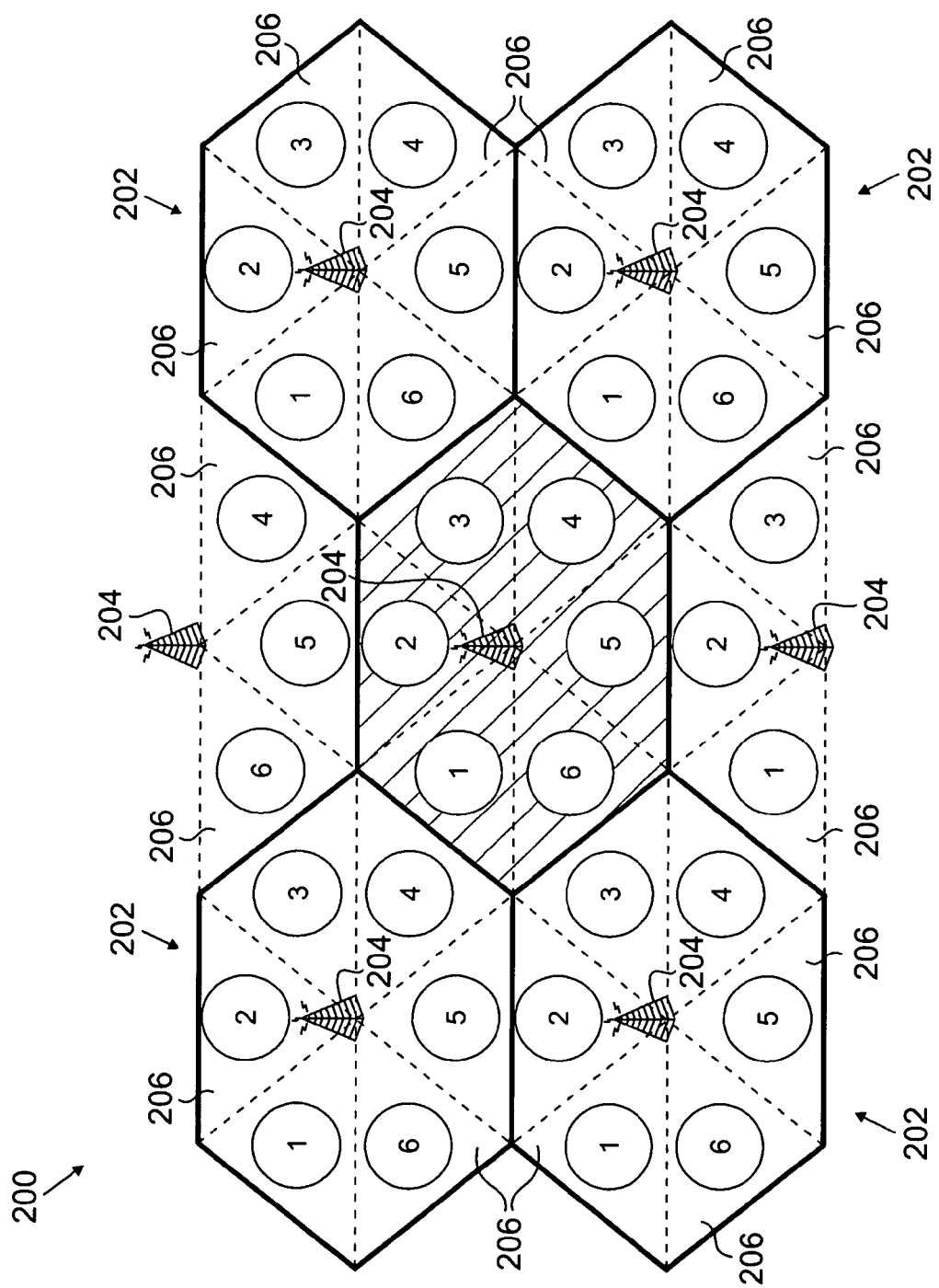
FIG. 2 illustrates one embodiment of conventional wireless communications system.

FIG. 2 illustratively depicts a conventional wireless system 200, comprising a plurality of whole and partial cells 202, each centered upon a respective base station 204. System 200 utilizes a conventional OFDMA configuration with six sectors 206 per cell. It should be noted that this topology may be referred to as a "frequency-reuse-of-1" type in relation to standards such as IEEE 802.16—even though this usage may not be consistent with conventional understandings of "frequency-reuse-of-1" in other wireless communication applications. For the purposes of this disclosure, however, "frequency-reuse-of-1" shall mean generally that neighbor cells, but not neighbor sectors, may utilize the same frequency spectrum—unless otherwise clearly indicated.

Typically, for the topology depicted in FIG. 2, the whole set of sub-channels within the available channel spectrum is divided into a corresponding number (e.g., six) of sub-channel groups, and each such group is allocated to a respective sector, on a static, fixed basis. In such a manner, each cell 202 may use the same spectrum as its neighboring cells 202, since sectors 206 are allocated in a manner such that no two adjoining sectors utilize the same sub-channel group. This topology does provide certain benefits, as previously described, but its static, symmetric nature limits optimal utilization of spectrum resources in dynamic operation of system 200.

Depending upon the standard or protocol utilized, some conventional systems provide no further means of spectrum optimization. Some conventional systems may provide for a slightly more robust fixed allocation scheme, as described now in reference to wireless system 300, illustratively depicted in FIG. 3. System 300 comprises a plurality of whole and partial cells 302, each centered upon a respective base station 304. System 300 utilizes an OFDMA configuration with six sectors 306 per cell. Again, it should be noted that this topology may be referred to as a "frequency-reuse-of-1" type in relation to standards such as IEEE 802.16—even though this usage may not be consistent with conventional understandings of "frequency-reuse-of-1" in other wireless communication applications.

The whole set of sub-channels within the available channel spectrum is divided into a corresponding number (e.g., six) of sub-channel groups. In this system, however, each sector is allocated two sub-channel groups—in a manner such that no two adjoining sectors 306 utilize the same pair of sub-channel groups. This allocation is again made on a static, fixed basis.

While such a topology and allocation of system 300 offers improved efficiency over that of system 200, it is still static and symmetric. As such, fixed sub-channel allocation schemes like and similar to systems 200 and 300 are generally not optimizable for rapidly and constantly changing asymmetric usage demands, and typically have difficulty in meeting high data rate requirements for end-users in heavily populated sectors while wasting unutilized spectrum resources at sparsely populated sectors.

Figure 3:
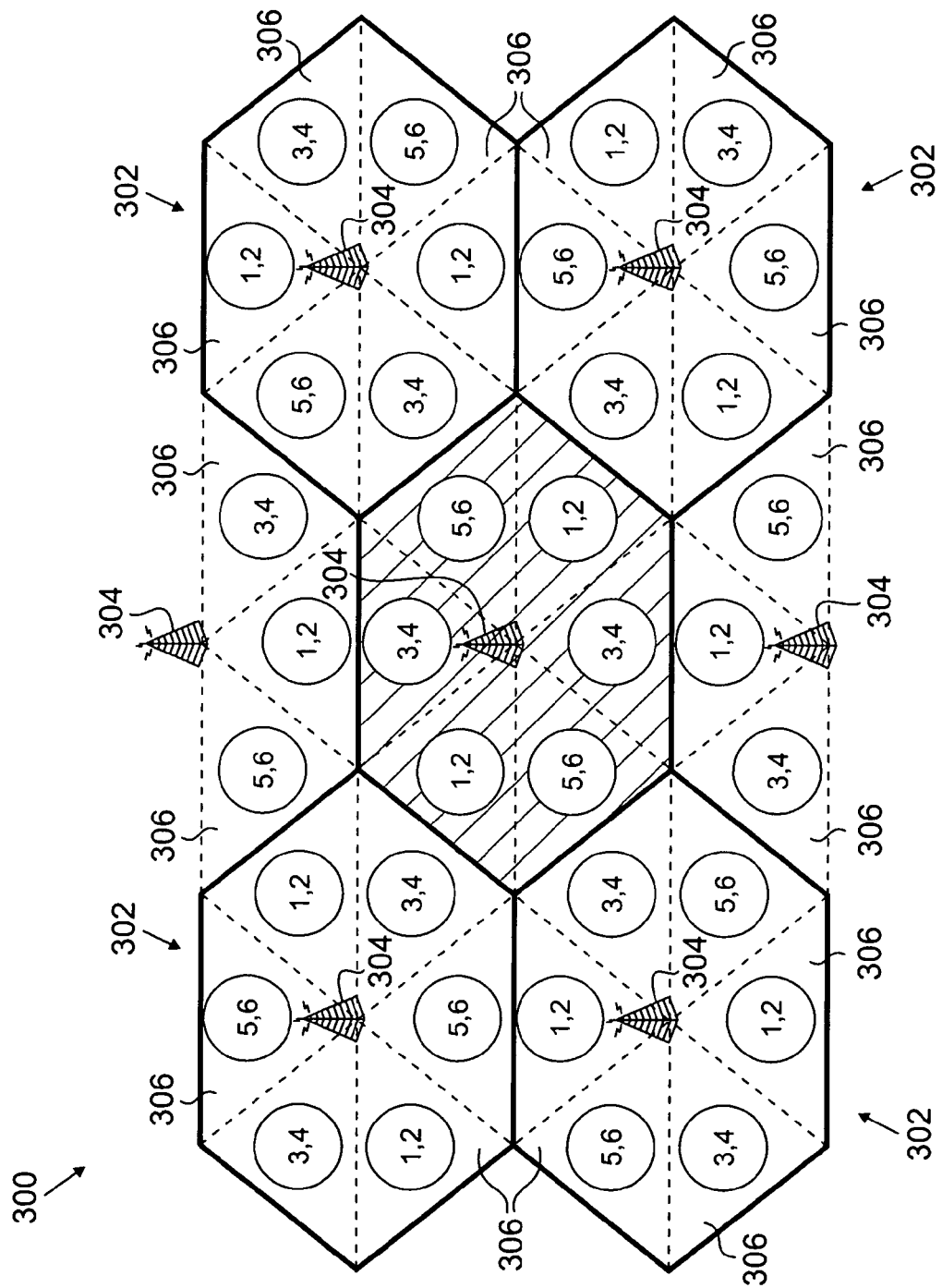
FIG. 3 illustrates another embodiment of conventional wireless communications system.

For purposes of further explanation and illustration, it is useful to describe a general reuse scheme—similar to those illustrated in FIGS. 2 and 3—as follows. In a typical case, the whole set of available sub-channels is divided into $N_S$ sub-channel groups, where $N_S$ is the number of the sectors per cell. Each sub-channel group is allocated to a sector. The configurations depicted in FIGS. 2 and 3 have, according to IEEE 802.16, frequency-reuse-of-1 with six sectors per cell—where each sector i has a potential sub-channel set $F_i[i=1, 2, 3, 4, 5, 6]$. The whole sub-channel set may then be defined as $F=\{F_i, i=1, \ldots, N_S\}$.

In contrast to the operational schemes illustrated in systems 200 and 300, the system of the present disclosure recognizes and comprehends that real-time usage demands in wireless systems may constantly fluctuate on a very rapid basis, and may frequently—if not predominantly—be asymmetric in nature. Additionally, real-time usage demands may vary on a diurnal basis or on a weekly basis. For example, in a sector associated with a residential area real-time usage demands may be very low while residents are working and/or at school during the day and higher while residents are home in the evenings and/or on weekends. Similarly, in a sector associated with business offices real-time usage demands may be high during the day on weekdays when employees are working and low in the evenings and on weekends when employees are not working. In yet another example, a sector that contains a sports complex may experience high real-time usage demands during sporting events and low real-time usage demands when no sports events is occurring. In yet another example, a sector that contains a portion of a commuting artery, for example a six lane limited access highway in an urban area, may experience high real-time usage demands during morning and evening rush hours and low real-time usage demands at other times. This system further comprehends that, while each sector may utilize up to the whole sub-channel set F, optimal performance is achieved when each sector instead utilizes only the minimum number of sub-channels necessary for efficiently supporting its traffic requirements.

Figure 4:
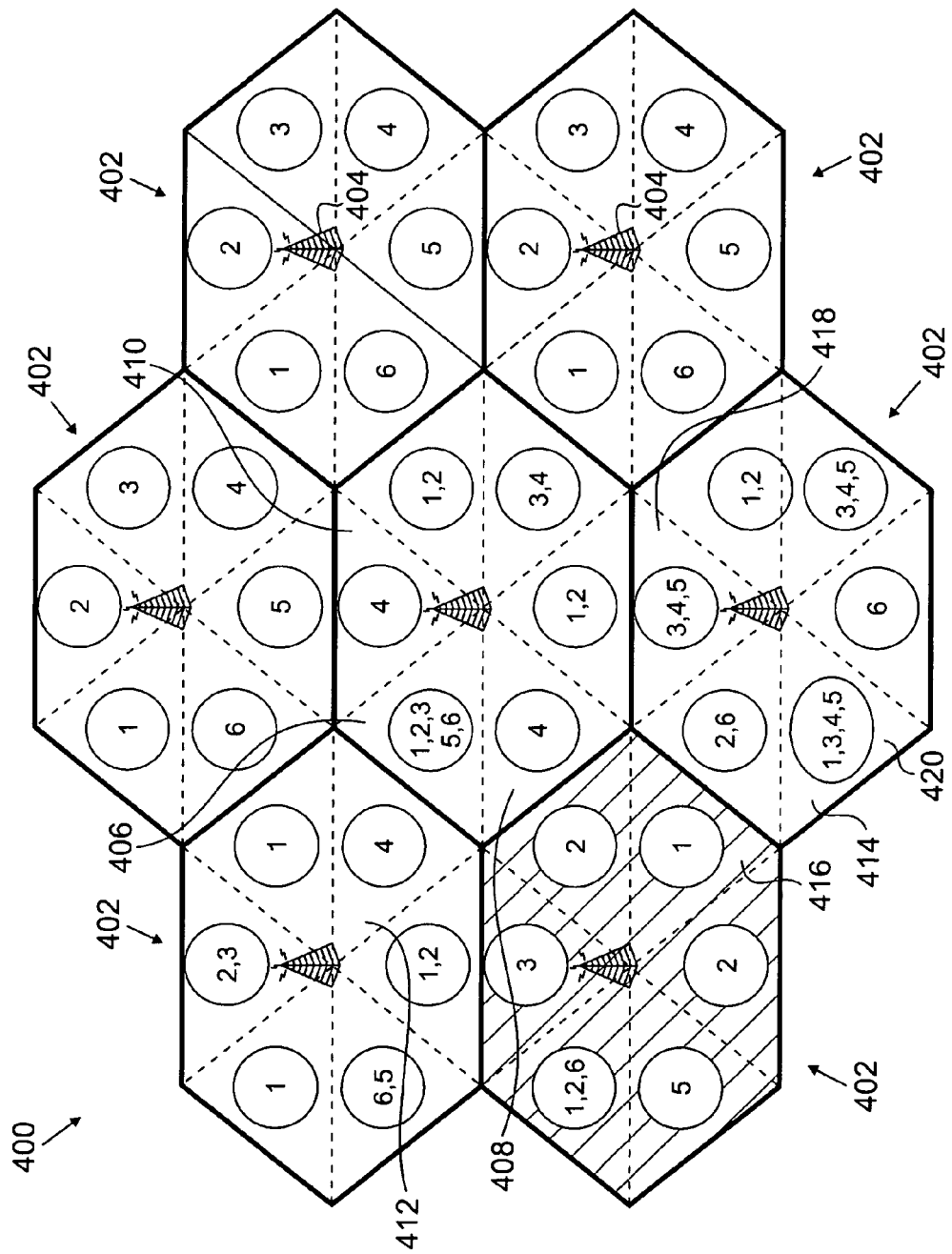
FIG. 4 illustrates another embodiment of wireless communications system in accordance with the present disclosure.

This is illustrated now in reference to FIG. 4, which depicts a wireless system 400. System 400 comprises a plurality of cells 402, each centered upon a respective base station 404, and utilizes an OFDMA configuration with six sectors per cell. In determining or setting allocation for sector 406, information regarding the allocation of adjoining sectors 408, 410 and 412 may be utilized to determine a maximum potential allocation for sector 406. In the example illustrated in FIG. 4, each of the adjoining sectors 408, 410 and 412 are allocated to sub-channel group (4). Thus, sector 406 has a pool of available sub-channel sets ($\{F_i\}$, i=1, 2, 3, 5, 6). If demands in sector 406 are sufficiently high, sector 406 may be allocated several or all of sub-channel groups 1, 2, 3, 5 or 6—enabling sector 406 to support as much traffic as possible.

The comparison and balancing of adjoining sectors—effectively forming those adjoining sectors into pool sets—and pooling of sub-channel sets associated with each such pool set, is performed for each sector in system 400. Across system 400, of course, different traffic requirements within different cells and sectors may result in asymmetric sub-channel allocation(s). For example, consider sector 414, and its adjoining sectors 416, 418 and 420. Based either on its utilization needs or upon its pool of available sub-channel sets, sector 416 has a sub-channel allocation of (1). Similarly, sector 418 has a sub-channel allocation of (3, 4, 5), while sector 420 has a sub-channel allocation of (1, 3, 4, 5). Note that sectors 418 and 420 may have the same or overlapping sub-channel allocations, since they are not directly adjoining one another. Given the allocations of sectors 416-420, sector 414 has a pool of available sub-channel sets ($\{F_i\}$, i=2, 6).

This approach substantially reduces co-channel interference amongst sectors, and ensures that a maximum number of sub-channels remain in a pool of spectrum allocation available to adjoining sectors—providing each sector with capacity to support more traffic. System-wide, this benefits all sectors and provides optimal aggregated spectrum efficiency.

The system of the present disclosure thus comprehends shifts in traffic load at each sector due to various factors (e.g., end-user mobility). This system further comprehends that variation in traffic requirements may occur at frequent, regular intervals, or infrequently, depending upon the system in which it is implemented. In order to accommodate such a wide range of system dynamics, the evaluation and allocation of the present disclosure may be performed on all sectors throughout system 400 in a synchronous or asynchronous manner, on a sequential, parallel or random basis, or in any other suitable manner required or desired.

Referring back to FIG. 1, the system of the present disclosure provides an allocation construct 128 performing the communication, evaluation and allocation described hereinabove. In the embodiment depicted, construct 128 is provided at the base station level. Construct 128 may be instantiated on a localized basis within a single base station—managing communications with and operations of other connected base stations in a dominant/subordinate relationship—or instantiated on a distributed basis in multiple base stations, operating in parallel. In other alternative embodiments, allocation construct 128 may be provided at any suitable equipment level throughout a wireless system, operating in either a localized or distributed manner.

Construct 128 may be implemented as an independent operational entity, or may be integrated into the functional or operational structure of existing operational protocols within a wireless network. For example, in systems based on the IEEE 802.16 standard, allocation construct 128 can be implemented within the context of the 802.16 Coordinated Synchronous Configuration Base Station operations mode.

Allocation construct 128 may be provided in a form that requires nominal information exchange between sectors/cells, and performs dynamic allocation with minimal computation. Functionally, each base station may access real-time information concerning sub-channel allocation in each of its neighbor cells. From this set of information, allocation status of adjoining sectors may be determined for any sector in the cell—forming a pool amongst that sector and its adjoining sectors. Each sector in the pool is configured to utilize only the minimum number of sub-channel groups necessary to support its current traffic requirements. As demand dictates, a sector may request additional sub-channel sets from the pool as needed. If the sector is allocated underutilized sub-channel sets, it returns those to the pool.

Thus, a given sector (T) shares a resource pool, $P_T$, with the set of its three adjoining sectors (X), (Y) and (Z). For ease of reference and understanding, sectors (T), (X), (Y) and (Z) may be considered as a single pool set ($S_T$) based about sector (T). Within sector (T), an increased demand for spectrum resources may require $F_r$ number of additional sub-channel groups, over and above its current allocation of $F_T$. The base station for sector (T) first finds the available sub-channel groups, $F_a$, within $P_T$, as follows:

$$F_a = F_P - (F_x \cup F_y \cup F_z);$$

where $F_P$ represents the total available sub-channel groups within $P_T$, and $F_x$, $F_y$, and $F_z$ represent the current sub-channel allocations in sectors (X), (Y) and (Z), respectively. If $F_r \leq F_a$, then $F_r$ sub-channel groups may be added to $F_T$ to satisfy requirements in sector (T). If $F_r > F_a$, then any available sub-channel groups may still be added to $F_T$ to satisfy demands, up to the maximum channel capacity.

Situations in which user demands in a heavily loaded cell exceed available sub-channel resources may be minimized with an allocation process of the type provided by present system. Generally, an allocation process of the present system begins with, for each base station in a subject network, the division of all sub-channels into $N_S$ sub-channel groups, where $N_S$ (e.g., 6) may be the number of sectors per cell, or any other desired number. With a higher $N_S$, a more flexible system having more resources to allocate may be provided, at a higher computational overhead. Thus, depending upon specific application requirements and capabilities, the value of $N_S$ may be optimized or tuned as desired. Once an $N_S$ value has been determined or selected, each sector is configured to some desired default allocation state. For example, each sector may be allocated a single sub-channel group.

From there, for each sector in the system, the allocation construct system analyzes or receives analysis from each sector concerning that sector's usage or traffic demands and requirements. In certain embodiments, relative prioritization of the sectors may be performed next. The allocation construct may prioritize sectors proportional to their requested load, or other relative importance or weighting factors may be implemented. The order of additional sub-channel allocation to the sectors may then be performed according to such a prioritization. At some desired interval, an $F_r$ value for each sector is evaluated. In response, additional sub-channel allocations may be made, or unused or underutilized sub-channel groups may be returned to the resource pool, as follows.

If $F_r = 0$ for a given sector, then its number of required sub-channel groups is equal to the number of sub-channel groups currently allocated (or being used). The allocation construct updates the sector and cell information accordingly, and resumes analysis as described. If $F_r < 0$ for a given sector, then its number of required sub-channel groups is less than the number being currently used. The sector returns unutilized sub-channel group(s) to the resource pool—and may do so in a random manner, or according to some desired ordering. If $F_r > 0$ for a given sector, then its number of required sub-channel groups is more than the number being currently used, and $F_a$ is evaluated. If there are enough unused sub-channel groups available (i.e., $F_r \leq F_a$), then the required sub-channel groups are allocated to the sector. If there are not enough unused sub-channel groups available (i.e., $F_r > F_a$), then the remaining sub-channel groups, if any, are allocated to the sector to support the demands up to maximum channel capacity. Information concerning each sector's most recent sub-channel allocation and status is updated for reference by the allocation construct, and the process repeats.

Thus, the constructs and methods of the present system provides dynamic and asymmetric sub-channel allocation that optimizes spectrum utilization for each sector in a frequency-reuse system, while minimizing or obviating inter-cell and intra-cell interference. Channel spectrum resources are pooled—each sector utilizes only the minimum resource it needs for efficient performance, and additional resources are allocated only on an as-needed basis. As demands or needs of a sector increase or decrease, a corresponding level of resource is either allocated from or returned to the spectrum pool.

It should be easily appreciated by one of skill in the art that the system of the present disclosure provides and comprehends a wide array of variations and combinations easily adapted to a number of wireless communications system. As described herein, the relative arrangement and operation of necessary functions may be provided in any manner suitable for a particular application. All such variations and modifications are hereby comprehended. It should also be appreciated that the constituent members or components of this system may be produced or provided using any suitable hardware, firmware, software, or combination(s) thereof.

The embodiments and examples set forth herein are therefore presented to best explain the present invention and its practical application, and to thereby enable those skilled in the art to make and utilize the system of the present disclosure. The description as set forth herein is therefore not intended to be exhaustive or to limit any invention to a precise form disclosed. As stated throughout, many modifications and variations are possible in light of the above teaching without departing from the spirit and scope of the following claims.

What is claimed is:

1. A method of allocating a transmission frequency range across a plurality of coverage areas in a wireless communications system, the method comprising the steps of:
    providing a plurality of coverage areas, each divided into an equal number of sectors;
    dividing the transmission frequency range into a desired number of sub-channel groups; and
    allocating one or more of the sub-channel groups to each sector, such that no two adjoining inter or intra coverage area sectors utilize the same sub-channel group at the same time, wherein the step of allocating comprises:
        identifying, for each sector, a set of adjoining inter-coverage and intra-coverage area sectors and associating those sectors into a pool set;
        allocating one of the desired number of sub-channel groups to each sector in the pool set; and
        allocating an additional sub-channel group to a sector on an as-needed basis.

2. The method of claim 1, wherein the wireless communications system utilizes orthogonal frequency division multiple access operation.

3. The method of claim 2, wherein the wireless communications system is based upon the IEEE 802.16 standard.

4. The method of claim 1, wherein the desired number of sub-channel groups is equal to the number of sectors in each coverage area.

5. The method of claim 1, further including reallocating one or more of the sub-channel groups to at least one sector, such that no two adjoining inter or intra coverage area sectors utilize the same sub-channel group at the same time.

6. The method of claim 1, wherein the step of allocating comprises:
    forming, for each pool set, a resource pool from the plurality of sub-channel groups;
    allocating one of the plurality of sub-channel groups in the resource pool to each sector in the pool set; and
    allocating an additional sub-channel group in the resource pool to a sector on an as-needed basis.

7. The method of claim 6, wherein the step of allocating further comprises:
    analyzing information relating sector usage requirements for each sector in the pool set;
    prioritizing a sector in the pool set based on the information; and
    allocating an additional sub-channel group in the resource pool to a sector based on its prioritization.

8. The method of claim 6, wherein the step of allocating an additional sub-channel group in the resource pool to a sector on an as-needed basis comprises:
    initiating a request for one or more additional sub-channel groups in the resource pool associated with a first sector in the pool set;
    determining which sub-channel groups, if any, in the resource pool are not already allocated to sectors in the pool set other than the first sector; and
    allocating to the first sector an additional sub-channel group from the sub-channel groups, if any, in the resource pool that are not already allocated to sectors in the pool set other than the first sector.

9. The method of claim 6, further comprising the step of de-allocating any unutilized sub-channel groups from a sector in the pool set.

10. A method of providing dynamic, asymmetric sub-channel allocation in an orthogonal frequency division multiple access wireless communications system, the method comprising the steps of:
    identifying a plurality of cells, each divided into an equal number of sectors;
    dividing a transmission channel associated with each cell into a plurality of sub-channel groups;
    identifying, for each sector, a set of adjoining inter and intra coverage area sectors and associating those sectors into a pool set;
    forming, for each pool set, a resource pool from the plurality of sub-channel groups;
    allocating one of the plurality of sub-channel groups in the resource pool to each sector in the pool set; and
    allocating an additional sub-channel group in the resource pool to a sector on an as-needed basis.

11. The method of claim 10, wherein the wireless communications system is based upon the IEEE 802.16 standard.

12. The method of claim 10, wherein the step of dividing a transmission channel associated with each cell into a plurality of sub-channel groups further comprises dividing a transmission channel associated with each cell into a plurality of sub-channel groups of number equal to the equal number of sectors in each cell.

13. The method of claim 10, wherein the step of dividing a transmission channel associated with each cell into a plurality of sub-channel groups further comprises dividing a transmission channel associated with each cell into a plurality of sub-channel groups of number greater than the equal number of sectors in each cell.

14. The method of claim 10, further comprising the steps of
analyzing information relating sector usage requirements for each sector in the pool set;
prioritizing a sector in the pool set based on the information; and
allocating an additional sub-channel group in the resource pool to a sector based on its prioritization.

15. The method of claim 10, wherein the step of allocating an additional sub-channel group in the resource pool to a sector on an as-needed basis comprises:
initiating a request for one or more additional sub-channel groups in the resource pool associated with a first sector in the pool set;
determining which sub-channel groups, if any, in the resource pool are not already allocated to sectors in the pool set other than the first sector; and
allocating to the first sector an additional sub-channel group from the sub-channel groups, if any, in the resource pool that are not already allocated to sectors in the pool set other than the first sector.

16. The method of claim 10, further comprising the step of de-allocating any unutilized sub-channel groups from a sector in the pool set.

17. A wireless communications system supporting dynamic and asymmetric sub-channel allocation, the system comprising:
a plurality of coverage areas, each having a base station associated therewith, and each being divided into an equal number of sectors;
a single transmission frequency spectrum, divided into a plurality of sub-channel groups; and
an allocation construct, resident on one or more of the base stations, that allocates one or more of the plurality of sub-channel groups to each sector, such that no two adjoining inter or intra coverage area sectors utilize the same sub-channel group at the same time, where the allocation construct allocates sub-channel groups by:
identifying, for each sector, a set of adjoining inter-coverage and intra-coverage area sectors and associating those sectors into a pool set;
allocating one of the plurality of sub-channel groups to each sector in the pool set; and
allocating an additional sub-channel group to a sector on an as-needed basis.

18. The system of claim 17, wherein the allocation construct resides on each base station on a distributed, parallel basis.

19. The system of claim 17, wherein the wireless communications system is orthogonal frequency division multiple access wireless communications system.

20. The system of claim 17, wherein the wireless communications system is an IEEE 802.16 system.

* * * * *

UNITED STATES PATENT AND TRADEMARK OFFICE
CERTIFICATE OF CORRECTION

PATENT NO. : 7,715,846 B2  
APPLICATION NO. : 11/369810  
DATED : May 11, 2010  
INVENTOR(S) : Baowei Ji et al.

Page 1 of 1

It is certified that error appears in the above-identified patent and that said Letters Patent is hereby corrected as shown below:

Column 11, claim 16, line 23, delete "dc-allocating" and replace with --de-allocating--.

Signed and Sealed this  
Twenty-second Day of March, 2011

David J. Kappos  
*Director of the United States Patent and Trademark Office*